(12) United States Patent
Izumi

(10) Patent No.: US 6,796,435 B2
(45) Date of Patent: Sep. 28, 2004

(54) SOLID-LIQUID SEPARATING APPARATUS

(75) Inventor: Shunji Izumi, Matsumoto (JP)

(73) Assignee: Izumi Products Company, Nagano (JP)

( * ) Notice: Subject to any disclaimer, the term of this patent is extended or adjusted under 35 U.S.C. 154(b) by 229 days.

(21) Appl. No.: 09/865,383

(22) Filed: May 25, 2001

(65) Prior Publication Data

US 2002/0000406 A1 Jan. 3, 2002

(30) Foreign Application Priority Data

Jun. 8, 2000 (JP) .......................................... 2000-172314

(51) Int. Cl.⁷ ....................... B01D 29/46; B01D 33/073; B01D 33/46
(52) U.S. Cl. ....................... 210/357; 210/396; 210/397; 210/360.2; 210/398; 210/402; 210/488
(58) Field of Search ................................ 210/357, 396, 210/397, 360.2, 398, 402, 488

(56) References Cited

U.S. PATENT DOCUMENTS

| | | |
|---|---|---|
| 1,649,581 A | 11/1927 | Genter et al. |
| 1,905,806 A | 4/1933 | Clark |
| 2,053,856 A * | 9/1936 | Weidenbacker |
| 2,547,941 A | 4/1951 | Heftler |
| 3,096,278 A | 7/1963 | Francom |
| 3,616,914 A | 11/1971 | Reid |
| 3,625,362 A | 12/1971 | Sicard |
| 3,643,806 A | 2/1972 | O'Cheskey |
| 4,146,481 A | 3/1979 | Nagaoshi et al. |
| 4,147,633 A | 4/1979 | Kato |
| 4,153,557 A | 5/1979 | Hori |
| 4,279,750 A | 7/1981 | Hori |
| 4,872,404 A | 10/1989 | Quetsch et al. |
| 5,026,487 A | 6/1991 | Abdulmassih |
| 5,118,414 A | 6/1992 | Byers |
| 5,228,987 A | 7/1993 | Arvanitakis |
| 5,389,256 A | 2/1995 | McEwen et al. |
| 5,656,162 A | 8/1997 | Nilsson |

FOREIGN PATENT DOCUMENTS

| | | | |
|---|---|---|---|
| AU | 549480 | | 1/1986 |
| DE | 1047170 | | 10/1955 |
| GB | 486397 | * | 6/1938 |
| GB | 1113114 | | 5/1968 |
| GB | 1200208 | | 7/1970 |
| JP | H2000-317693 | | 11/2000 |
| NL | 8701313 | | 1/1988 |

* cited by examiner

Primary Examiner—Thomas M. Lithgow
(74) Attorney, Agent, or Firm—Koda & Androlia

(57) ABSTRACT

A solid-liquid separating apparatus comprising a cylindrical strainer formed by circular ring members with gaps in between, a casing having the strainer therein, and scrapers disposed in the respective gaps between the circular ring members for removing solid matter adhering to the end (flat) surfaces of the circular ring members. Each of the scrapers comprises a flat auxiliary circular ring member and a flat protruding element. The external diameter of the auxiliary circular ring member is smaller than the external diameter of the circular ring members and is larger than the internal diameter of the circular ring members, and the protruding element extends from the outer circumferential surface of the auxiliary circular ring member. The auxiliary circular ring members are disposed coaxially with the circular ring members, and the tip ends of protruding elements reach the outer circumferences of the circular ring members.

5 Claims, 9 Drawing Sheets

SOLID-LIQUID SEPARATING APPARATUS

BACKGROUND OF THE INVENTION

1. Field of the Invention

The present invention relates to a solid-liquid separating apparatus for separating solid matter, raw contaminants, etc. from liquid of a solid-liquid mix.

2. Prior Art

Solid-liquid separating apparatus are used in, for example, raw contaminant dehydration treatment devices, etc. installed in kitchen sinks. Such solid-liquid separating apparatus separates the solid matter and liquid from water-containing raw contaminants produced as a mixture of solid matter and liquid by mixing raw contaminants discharged from the kitchen with water and pulverizing this mixture.

One of such solid-liquid separating apparatuses is described in Japanese Patent Application No. H11-133089 (Laid-Open (Kokai) No. 2000-317693) filed by the applicant of the present application.

This prior art solid-liquid separating apparatus will be described with reference to FIGS. 6 and 7.

The solid-liquid separating apparatus 10 is comprised substantially of a strainer 12 and a casing 24.

The strainer 12 is in a cylindrical shape by way of arranging a plurality of flat-plate-form circular ring members 14 adjacent each other with specified gaps in between. The casing 24 has an accommodating section 26 that accommodates the strainer 12.

The accommodating section 26 is divided by the strainer 12 into two regions: an internal region B that is inside the strainer 12 and an external region C that is outside the strainer 12. An intake port 28 that introduces a mixture of solid matter and a liquid is formed in the external region C, and an outlet port 30 that discharges to the outside the liquid that passes between the circular ring members 14 and advances into the internal region B is formed in the internal region B.

The solid-liquid separating apparatus 10 further includes a scraper 20. The scraper 20 is comprised of a plurality of flat-plate-form (fin-form) protruding elements 22 so that the tip ends thereof enter the respective gaps between the circular ring members 14. The scraper 20 is moved relative to the strainer 12 and the protruding elements 22 thereof scrape away solid matter adhering to the end surfaces (or the flat, side surfaces) of the circular ring members 14 that form the strainer 12. The flat-plate-form protruding elements 22 enter from the outer circumferential sides of the circular ring members 14 into the gaps. The tip ends of the protruding elements 22 reach the inner circumferential surfaces of the circular ring members 14 and advance into the internal region B of the strainer 12.

Both end surfaces (flat surfaces) of the respective flat-plate-form protruding elements 22 that enter the respective gaps between the circular ring members 14, i.e., the spaces between the end surfaces (flat surfaces) of the circular ring members 14, make rubbing contact with the end surfaces (flat surfaces) of the circular ring members 14 that are positioned on both sides of each flat-plate-form protruding element 22.

The plurality of flat-plate-form protruding elements 22 are provided on, for instance, a supporting member 32 (see FIG. 7). The protruding elements 22 protrude from the supporting member 32 toward the strainer 12. The supporting member 12 is installed parallel to the axis of the strainer 12 and forms a part of the scraper 20 together with the flat-plate-form protruding elements 22. The flat-plate-form protruding elements 22 are arranged so as to have gaps in between that are substantially equal in size to the thickness of the circular ring members 14 and also have a fixed spacing between adjacent flat-plate-form protruding elements 22. As one example, the flat-plate-form protruding elements 22 are in a wedge shape (see FIG. 6). The end surfaces of the protruding elements 22 on the upstream side with respect to the direction of rotation D of the strainer 12 are formed as inclined surfaces with respect to the radial direction of the circular ring members 14. As a result, the solid matter that has been scraped away from the end surfaces of the circular ring members 14 is gradually moved toward the outer circumferences of the circular ring members 14 as the strainer 12 rotates.

Furthermore, the edge of the end surface of the supporting member 32 on the upstream side with respect to the direction of rotation D (see FIG. 6) of the strainer 12 is in contact with the outer circumferential surfaces of the circular ring members 14 so as to function as a scraper that scrapes away the solid matter 16 deposited on the outer circumferential surfaces of the circular ring members 14. Accordingly, the end surface of the supporting member 32 on the upstream side with respect to the direction of rotation D of the strainer 12 is formed as an inclined surface with respect to the radial direction of the circular ring members 14. Thus, the solid matter 16 that has been scraped from the outer circumferential surfaces of the circular ring members 14 is gradually moved away from the circular ring members 14 as the strainer 12 rotates.

With the structure above, the scraper 20 scrapes away the solid matter 16 adhering to the end surfaces of the circular ring members 14 by the flat-plate-form protruding elements 22, and solid matter 16 adhering to the outer circumferential surfaces of the circular ring members 14 is scraped away by the end surface of the supporting member 32 that is located on the upstream side with respect to the direction of rotation D of the strainer 12. The solid matter 16 that has been scraped away is moved by the flat-plate-form protruding elements 22, which are formed with inclined surfaces that incline with respect to the radial direction of the scraper 20, and by the end surface of the supporting member 32 that is located on the upstream side with respect to the direction of rotation D of the strainer 12. As a result, the solid matter 16 is extracted through a discharge opening 34 disposed in the casing 24 and on the upstream side of the scraper 20.

The driving device 36, that is a motor and the like, rotates the strainer 12. The strainer 12 is rotated continuously during the solid-liquid separation process.

In operation, the strainer 12 acts as a filter. In other words, the liquid 18 passes through the gaps between the stacked circular ring members 14 and advances into the internal region B, and the solid matter 16 that is larger than the gaps is deposited on the outer circumferential surfaces of the circular ring members 14. Some of the solid matter 16 that can advance into the gaps adhere to the end surfaces of the circular ring members 14 and cannot advance into the internal region B. As a result, the solid matter and liquid are separated.

The liquid 18 that has advanced into the internal region B is discharged to the outside of the casing 24 via the outlet port 30. The solid matter 16 adhering to or deposited on the circular ring members 14 is scraped away by the scraper 20 and discharged to the outside of the casing 24 via the discharge opening 34 that is opened in the casing 24. Since the solid matter 16 deposited or adhering on the outer circumferential surfaces and end surfaces of the circular ring members 14 is scraped away by the scraper 20 each revolution of the strainer 12, no clogging would occur; and solid-liquid separation is continuously performed.

The space of each one of the gaps between the end surfaces of the respective circular ring members 14 that make up the strainer 12 is determined based upon the size of the solid matter that is to be separated from the liquid. More specifically, if it is desired to separate even solid matter 16 of a small size so that the proportion of solid matter contained in the liquid 18 following the separation is reduced and the quantity of contaminants in the liquid 18 is thus reduced, then the spacing of the gaps between the circular ring members 14 is narrowed. For the opposite case, the spacing of the gaps between the circular ring members 14 is widened to some extent.

FIGS. 8 through 10 show the solid-liquid separating apparatus 10 in a concrete manner. The solid-liquid separating apparatus 10 comprises the strainer 12, the casing 24, the scraper 20 and a driving device 36 that rotationally drives the strainer 12.

The strainer 12 is formed into a cylindrical body by stacking sideways a plurality of circular ring members 14 with gaps in between. The circular ring members 14 consist of two types of ring members: flat-plate-form first circular ring members 14a and flat-plate-form second circular ring members 14b. The second circular ring members 14b have the same external diameter as the first circular ring members 14a, and a plurality of outer projections 38 (in FIG. 8, three outer projections 38) are formed at specified angular intervals on the outer circumferential surface of the second circular ring members 14b.

More specifically, the strainer 12 is formed in a cylindrical body. This cylindrical strainer 12 is obtained by stacking a plurality of the respective circular ring members 14a and 14b side by side with specified gaps between the respective circular ring members 14a and 14b. A specified number of first circular ring members 14a (for instance, a single first circular ring member 14a in FIGS. 9 and 10) are interposed between two second circular ring members 14b.

Furthermore, spacers 44 are fitted over first stays 42 that pass through through-holes 40 formed in the respective circular ring members 14a and 14b and integrally connect all of the circular ring members 14a and 14b. Thus, the spacers 44 are used as a means for setting the spacing of the circular ring members 14a and 14b. The thickness of the spacers 44 constitutes the size of the spacing of the gaps between the respective circular ring members 14a and 14b. Ordinarily, the thickness of the spacers 44 is selected so as to match the thickness of the flat-plate-form protruding elements 22 disposed between the respective circular ring members 14a and 14b and to be at substantially the same thickness. In cases where the friction that is generated between the flat-plate-form protruding elements 22 and the respective circular ring member 14a and 14b is large, then the thickness of the spacers 44 is set slightly larger than the thickness of the flat-plate-form protruding elements 22.

Spokes in, for instance, letter Y-shape are formed so as to be connected to the inner edges of the circular ring members 14a and 14b; and a rotating shaft 48 is installed in the center of these spokes 46. Both ends of the rotating shaft 48 are rotatably supported on the casing 24. At least one end of the rotating shaft 48 protrudes to the outside of the casing 24, and this end is rotationally driven by the driving device 36. The strainer 12 is thus rotated in the direction of arrow D. Various structures are conceivable as the connecting structures between the Y-shaped spokes 46 and the strainer 12. In one example, two sets of Y-shaped spokes 46 are used, and these Y-shaped spokes 46 are connected to two circular ring members 14 positioned at both ends of the strainer 12.

The second circular ring members 14b which have the outer projections 38 on their outer circumferential surfaces are arranged so that the outer projections 38 form the ribs 50 on the outer circumferential surface of the strainer 12. Thus, the ribs 50 extend in the axial direction of the strainer 12. In other words, when the strainer 12 is viewed from one end thereof, the outer projections 38 of one second circular member 14b is positioned directly behind the outer projections 38 of the next second circular ring member 14b so that the ribs 50 are formed by these outer projections 38. As a result, a plurality of ribs 50 that extend parallel to the axis of the strainer 12 are formed on the outer circumferential surface of the strainer 12. Since the first circular ring members 14a that have no outer projections 38 are interposed between the second circular ring members 14b, spaces are formed in the ribs 50.

The ribs 50 push and transfer the separated solid matters 16 to the discharge opening 34 along the inner surface of the tubular accommodating section 26.

The strainer 12 is installed inside the tubular accommodating section 26 so that the axis of rotation of the strainer 12, i.e., the rotating shaft 48 that is connected to the strainer 12, is oriented in a horizontal direction. The openings at both ends of the strainer 12 are closed off by a pair of opposite inside wall surfaces of the tubular accommodating section 26 of the casing 24. Thus, the movement of the liquid between the outer region C and inner region B of the strainer 12 is accomplished mainly by the gaps between the circular ring members 14a and 14b.

In the solid-liquid separating apparatus 10 shown in FIG. 8, the intake port 28 is located at a lower position than the outlet port 30. Thus, the mixture constantly accumulates in the lower portion of the tubular accommodating section 26, the lower portion of the strainer 12 is immersed in the mixture, and the upper portion of the strainer 12 is exposed above the liquid level F of the mixture.

The discharge opening 34 is opened in the upper portion of the tubular accommodating section 26 so that the discharge opening 34 is located in the outer region C of the strainer 12. The discharge opening 34 extends in the direction of the axis of rotation of the strainer 12, so that it allows the solid matter 16, that has been separated from the liquid and carried along the inner circumferential surface of the tubular accommodating section 26 by the ribs 50, to be discharged to the outside of the casing 24.

The discharge opening 34 opens into the space of the tubular accommodating section 26 above the liquid level F of the mixture. The discharge opening 34 is located on the downstream side of the top area of the strainer 12 with respect to the direction of rotation of the strainer 12 and is on the upstream side of the scraper 20 with respect to the direction of rotation of the strainer 12.

A cover member 52 is disposed on the discharge opening 34 of the casing 24 so as to close the discharge opening 34. More specifically, one end of the cover member 52 is pivotally connected to the edge of the discharge opening 34 located on the upstream side of the discharge opening 34 with respect to the direction of rotation D of the strainer 12, so that the other end of the cover member 52 that is on the downstream side with respect to the direction of rotation D of the strainer 12 is moved or swings toward and away from the discharge opening 34 as indicated by two-head arrow in FIG. 8.

The cover member 52 is constantly urged toward the strainer 12 by an urging means such as a spring, 54. The spring 54 is coupled at one end thereof to the casing 24 and at another end thereof to the cover member 53.

By way of bias of the spring 54, the cover member 52 presses the solid matter 16 that is pushed and moved by the ribs 50 of the strainer 12 against the outer circumferential surface of the strainer 12 and squeezes the liquid out of the solid matter 16.

As seen from FIG. 10, the scraper 20 is constructed by stacking a plurality of flat plates sideways. The scraper 20 is, as shown in FIG. 8, disposed on the downstream side of the top area of the strainer 12 with respect to the direction of rotation D of the strainer 12. In addition, the scraper 20 is disposed near the discharge opening 34 so that it is located on the downstream side of the discharge opening 34 with respect to the direction of rotation D of the strainer 12.

The scraper 20 will be further described below in regards to its more concrete structure.

The scraper 20 is comprised of plate-form first protruding elements 56, plate-form second protruding elements 58 and supporting elements 60.

Each of the first protruding elements 56 is formed from a plate material that has the same thickness as that of the respective first circular ring members 14a that make up the strainer 12, and the tip end (upper end in FIG. 10) of the first protruding element 56 protrudes toward the outer circumferential surface of each one of the first circular ring members 14a so as to scrape away solid matter 16 adhering to the outer circumferential surfaces of the first circular ring members 14a.

Each of the second protruding elements 58 is formed from a plate material that has the same thickness as each one of the gaps between the first circular ring members 14a and second circular ring members 14b. The tip end (upper end in FIG. 10) of the second protruding element 58 advances into the gaps between the first and second circular ring members 14a and 14b so as to scrape away solid matter 16 adhering to the respective flat end surfaces of the circular ring members 14a and 14b.

Each of the supporting elements 60 is formed from a plate material that has the same thickness as that of the respective second circular ring members 14b are formed with outer projections 38 on their outer circumferential surfaces.

The first protruding elements 56, second protruding elements 58 and supporting elements 60 are, as seen from FIG. 9, disposed in a specified order in accordance with the disposing order of the first circular ring members 14a and second circular ring members 14b that make up the strainer 12. More specifically, the first protruding elements 56 are positioned so as to face the circumferential surfaces of the first circular ring members 14a, the second protruding elements 58 are positioned so that pointed end areas thereof enter into the gaps between the circular ring members 14a and 14b, and the supporting elements 60 are positioned so as to face the circumferential surfaces of the second circular ring members 14b. The first protruding elements 56, second protruding elements 58 and supporting elements 60 are further formed into an integral unit by second stays 64 that pass through through-holes 62 formed in these elements.

In this structure, the gaps between the respective circular ring members 14a and 14b are set to be smaller than the thickness of the respective circular ring members 14a and 14b. As a result, the thickness of the second protruding elements 58 that advance into the gaps between the respective circular ring members 14a and 14b is smaller than the thickness of the circular ring members 14a and 14b. Thus, the strength of the second protruding elements 58 might be insufficient. Accordingly, the second protruding elements 58 are reinforced by being interposed between the first protruding elements 56 and the supporting elements 60 that are positioned on both sides of the second protruding elements 58.

In the structures shown in FIGS. 9 and 10, the first circular ring members 14a are positioned at both ends of the strainer 12 (which is a cylindrical shape as a whole). Accordingly, the first protruding element 56, the second protruding element 58 and the supporting element 60 are disposed in this order from one end of the scraper 20, thus forming a "unit"; and this "unit" is repeated in the direction of the second stays 64, and the first protruding element 56 is disposed at another end of the scraper 20.

Here, the first protruding elements 56, supporting elements 60 and second stays 64 also function as a supporting member 32 which holds and supports the second protruding elements 58 that enter the spaces between the first circular ring members 14a and second circular ring members 14b and scrape away the solid matter 16.

In the structure shown in FIG. 10, the first protruding elements 56 which are positioned at both ends of the scraper 20 differ in shape from other first protruding elements 56 positioned in the intermediate portions of the scraper 20. In other words, the first protruding elements 56 at both ends are larger and have a broader area compared to other first protruding elements 56. The intention is to have these first protruding elements 56 at both ends hold the cover member 52 (positioned on the upstream side of the scraper 20 with respect to the direction of rotation D of the strainer 12) from both sides so that both ends of the cover member 52 are covered by these first protruding elements 56.

The solid material 16 moved by the strainer 12 are scraped away while being traveling downward from the top area of the strainer 12, thus being separate from the strainer 12 and discharged out through the discharge opening 34.

However, the above-described solid-liquid separating apparatus has problems.

What determines the solid-liquid separating performance of the strainer 12 is, as described above, the dimension (width) of the gaps between (the end surfaces of) the respective circular ring members 14 that are disposed next to each other; and this dimension is determined by the thickness of the flat-plate-form protruding elements 22 which are inserted into only limited portions of the ring-shape gaps between the respective circular ring members 14.

Therefore, in order to improve the solid-liquid separating performance of the strainer 12, it is necessary to narrow these gaps. However, if it is desired to ensure the durability and mechanical strength of the flat-plate-form protruding elements 22, there are limits to how far the thickness of the flat-plate-form protruding elements 22 can be reduced.

In other words, in the prior art apparatus, the solid-liquid separating performance of the strainer 12 is limited by the thickness of the flat-plate-form protruding elements 22 of the scraper 20.

SUMMARY OF THE INVENTION

Accordingly, the present invention solves the above-described problems.

The object of the present invention is to provide a solid-liquid separating apparatus that provides an improved solid-liquid separating performance of the strainer without being affected by the structure of the scraper.

The above object is accomplished by a unique structure for a solid-liquid separating apparatus that is comprised of:

a strainer that is a cylindrical body formed by a plurality of flat-plate-form circular ring members with gaps in between;

a casing with an accommodating section for accommodating therein the strainer, the accommodating section being divided by the strainer into an internal region that is inside the strainer and an external region that is outside the strainer, an intake port that introduces a mixture of solid matter and liquid being formed in the external region, and an outlet port that discharges to the outside the liquid that passes between the circular ring members and advances into the internal region being formed in the internal region, and a plurality of scrapers that are provided in the gaps between the circular ring members, the scrapers being moved along the outer circumferential surfaces of the circular ring members so as to scrape away the solid matter adhering to the circular ring members, wherein the unique structure of the present invention is that the each of the scrapers is comprised of:

a flat-plate-form auxiliary circular ring member having an external diameter that is smaller than the external diameter of the circular ring members and is larger than the internal diameter of the circular ring members, and a flat-plate-form protruding element extending from the outer circumferential surface of the auxiliary circular ring member, the protruding element being in the same plane as the auxiliary circular ring member, and wherein the auxiliary circular ring member is disposed in coaxial with the circular ring members, and the flat-plate-form protruding element has a length that reaches the outer circumferential surfaces of the circular ring members.

With the above structure, the solid-liquid separating performance of the strainer is determined by the dimension of the gaps between the end (flat) surfaces of the circular ring members that form the strainer and the end (flat) surfaces of the auxiliary circular ring members of the scraper that are disposed between the circular ring members in coaxial with the circular ring members. In other words, the solid-liquid separating performance of the strainer is not affected by the thickness of the auxiliary circular ring members. As a result, the present invention provides an improved solid-liquid separating performance while the thickness of the auxiliary circular ring members is kept at dimensions that ensure the strength and durability of the auxiliary circular ring members.

Furthermore, in the present invention, a plurality of the flat-plate-form protruding elements are installed by being lined up in a single row. With this arrangement, the end surfaces of the flat-plate-form protruding elements located on the upstream side with respect to the direction of rotation of the strainer collectively form a single scraping surface. Thus, solid matter is efficiently scraped away by the scraper and easily discharged to the outside of the casing.

DETAILED DESCRIPTION OF THE INVENTION

Preferred embodiments of the solid-liquid separating apparatus of the present invention will be described below in detail with reference to the accompanying drawings.

Figure 1:
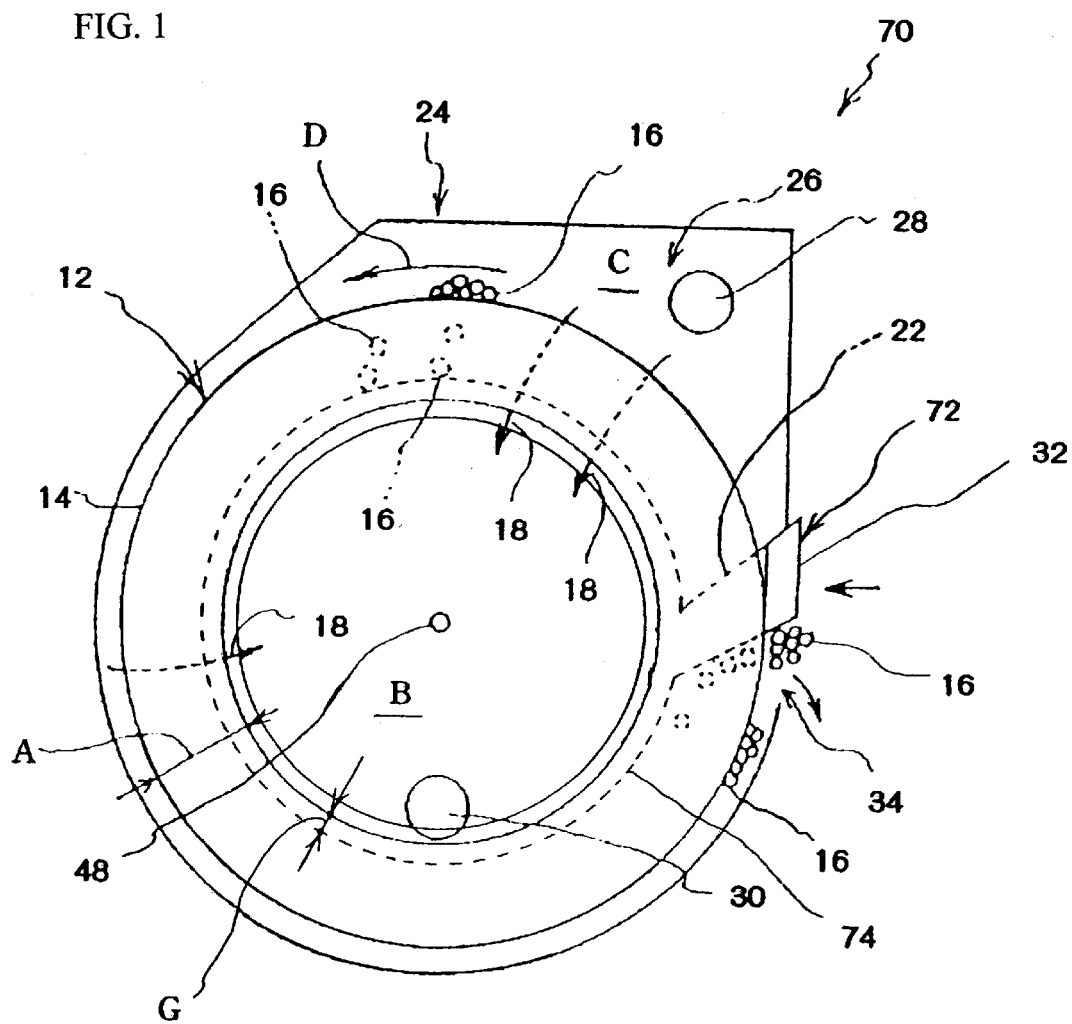
FIG. 1 is an explanatory diagram that illustrates the basic concept of the solid-liquid separating apparatus according to the present invention.
Figure 2:
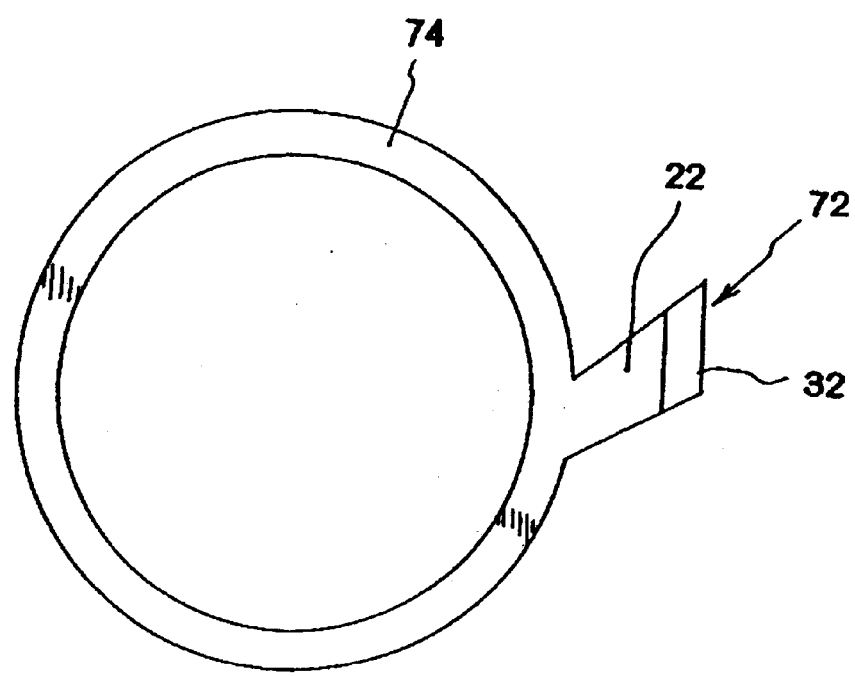
FIG. 2 is a front view of a scraper of the present invention comprising the auxiliary circular ring member and the flat-plate-form protruding element.
Figure 6:
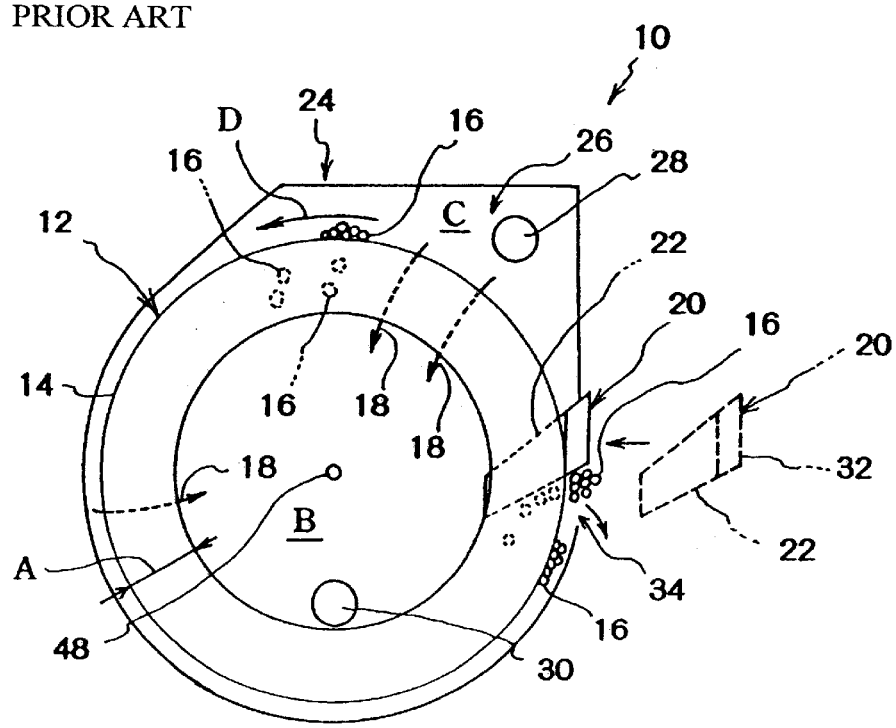
FIG. 6 is an explanatory diagram of the basic concept of a prior art solid-liquid separating apparatus.
Figure 7:
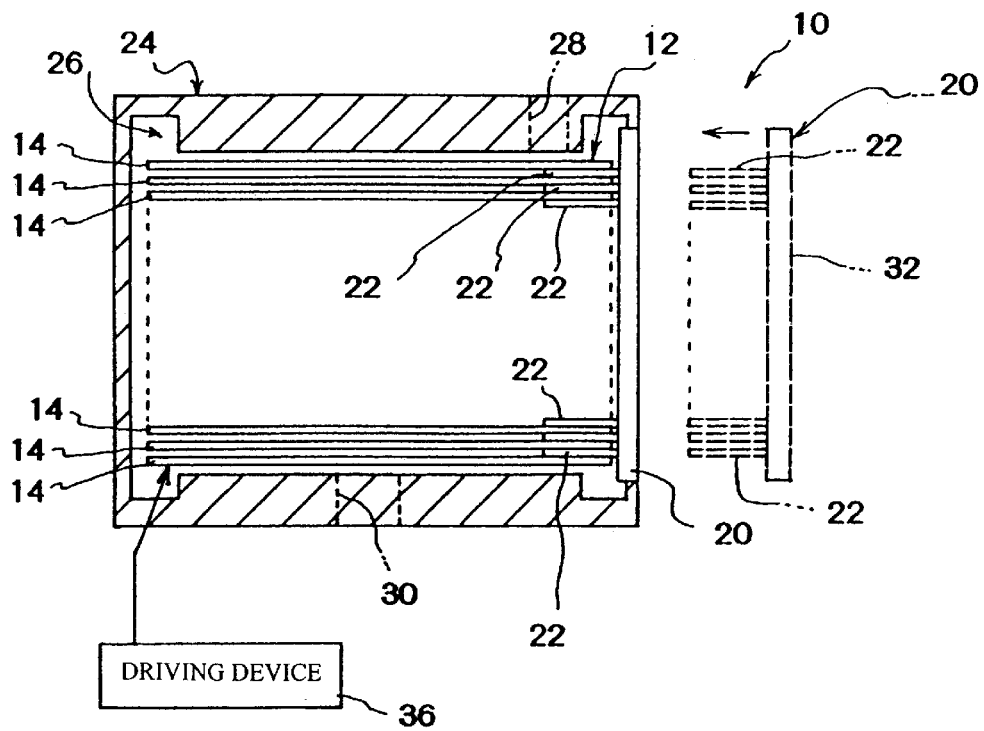
FIG. 7 is a sectional view taken along the axis of rotation of the strainer in the apparatus of FIG. 6.

The constituting elements of the solid-liquid separating apparatus 70 of the present invention shown in FIGS. 1 and 2 are substantially the same as those of the solid-liquid separating apparatus 10 shown in FIGS. 6 and 7. Accordingly, the elements that are the same as those of FIGS. 6 and 7 are labeled with the same reference numerals, and a description of such elements is omitted. Only the constituting elements that differ from the shown prior art and make the characterizing features of the present invention will be described below.

As seen from FIG. 1, the solid-liquid separating apparatus 70 of the present invention substantially comprises the strainer 12, the casing 24, a scraper 72 and the driving device (not shown but is the same as the driving device 36 shown in FIG. 7).

The feature of the solid-liquid separating apparatus 70 of the present invention is the scraper 72. In the present invention, the scraper 72 comprises a flat-plate-form circular ring member (auxiliary circular ring member) 74 that is integrally connected to the tip end of the flat-plate-form protruding element 22. In other words, the scraper 72 takes a structure in which the flat-plate-form protruding element 22 is extended from the outer circumferential surface of the auxiliary circular ring member 74; and the auxiliary circular ring member 74 has the same thickness as the flat-plate-form protruding element 22, so that the protruding element 22 is in the same plane as the auxiliary circular ring member 74. For convenience of description, the auxiliary circular ring member 74 and flat-plate-form protruding element 22 will hereafter be collectively referred to as a "scraper component(s) 76".

The structure of the scraper component 76 will be described in detail with reference to FIGS. 1 and 2.

First, the auxiliary circular ring member 74 is formed so that the external diameter is smaller than the external diameter of the circular ring members 14 that form the strainer 12. Also, the external diameter of the auxiliary circular ring member 74 is larger than the internal diameter of the circular ring members 14. In the shown embodiment, the internal diameter of the auxiliary circular ring members 74 is smaller than the internal diameter of the circular ring members 14 (see FIG. 5). However, the present invention is not limited to this arrangement. The internal diameter of the auxiliary circular ring member 74 can be the same as the internal diameter of the circular ring members 14 or greater than the internal diameter of the circular ring members 14.

The flat-plate-form protruding element 22 of scraper component 76 is formed so as to extend from the outer circumferential surface of the flat-plate-form auxiliary circular ring member 74 as an integral part of the auxiliary circular ring member 74. The flat-plate-form protruding element 22 is on the same plane as the flat surface of the auxiliary circular ring members 74.

A plurality of scraper components 76 are respectively provided between gaps between adjacent circular ring members 14. In other words, one scraper component 76 is disposed in intermediate position in each of the gaps between the circular ring members 14 which are arranged side by side, the gaps being slightly greater than the thickness of the scraper component 76. The auxiliary circular ring members 74 (of the scraper components 76) are installed so as to be coaxial with the circular ring members 14. The outer ends of the flat-plate-form protruding elements 22 reach the outer circumferential surfaces (or protrude over the outer circumferential surfaces) of the circular ring members 14.

Figure 3:
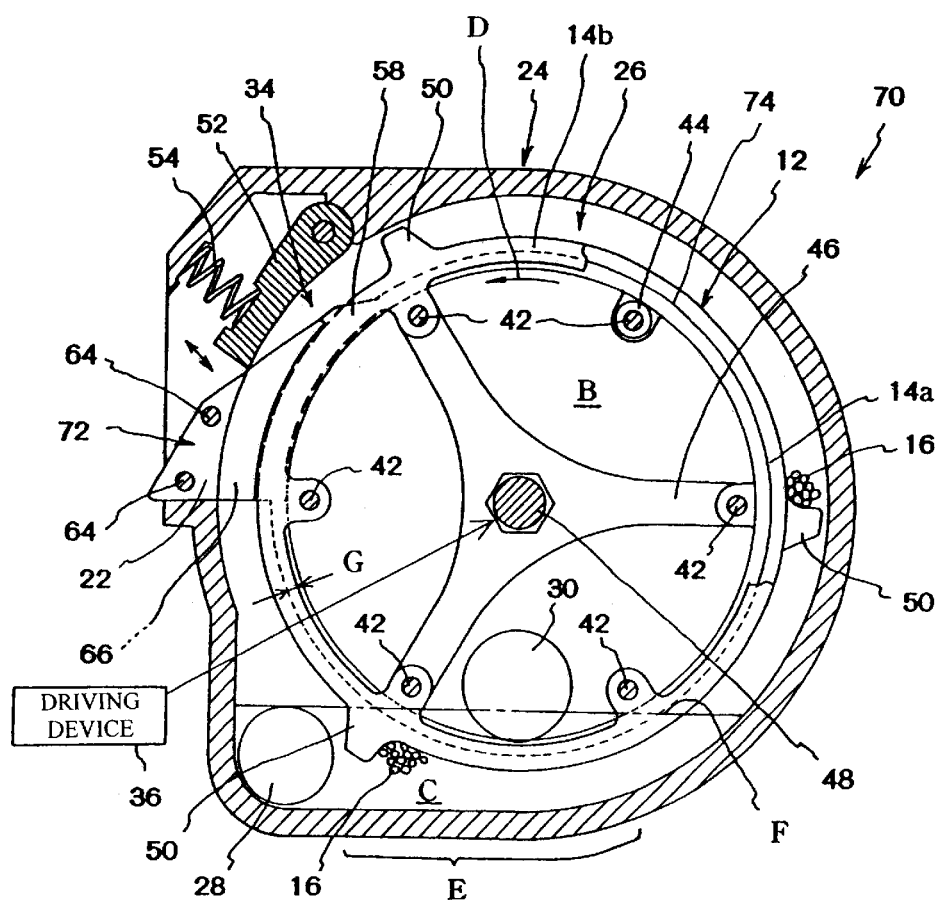
FIG. 3 is a sectional front view of the solid-liquid separating apparatus according to the present invention.
Figure 5:
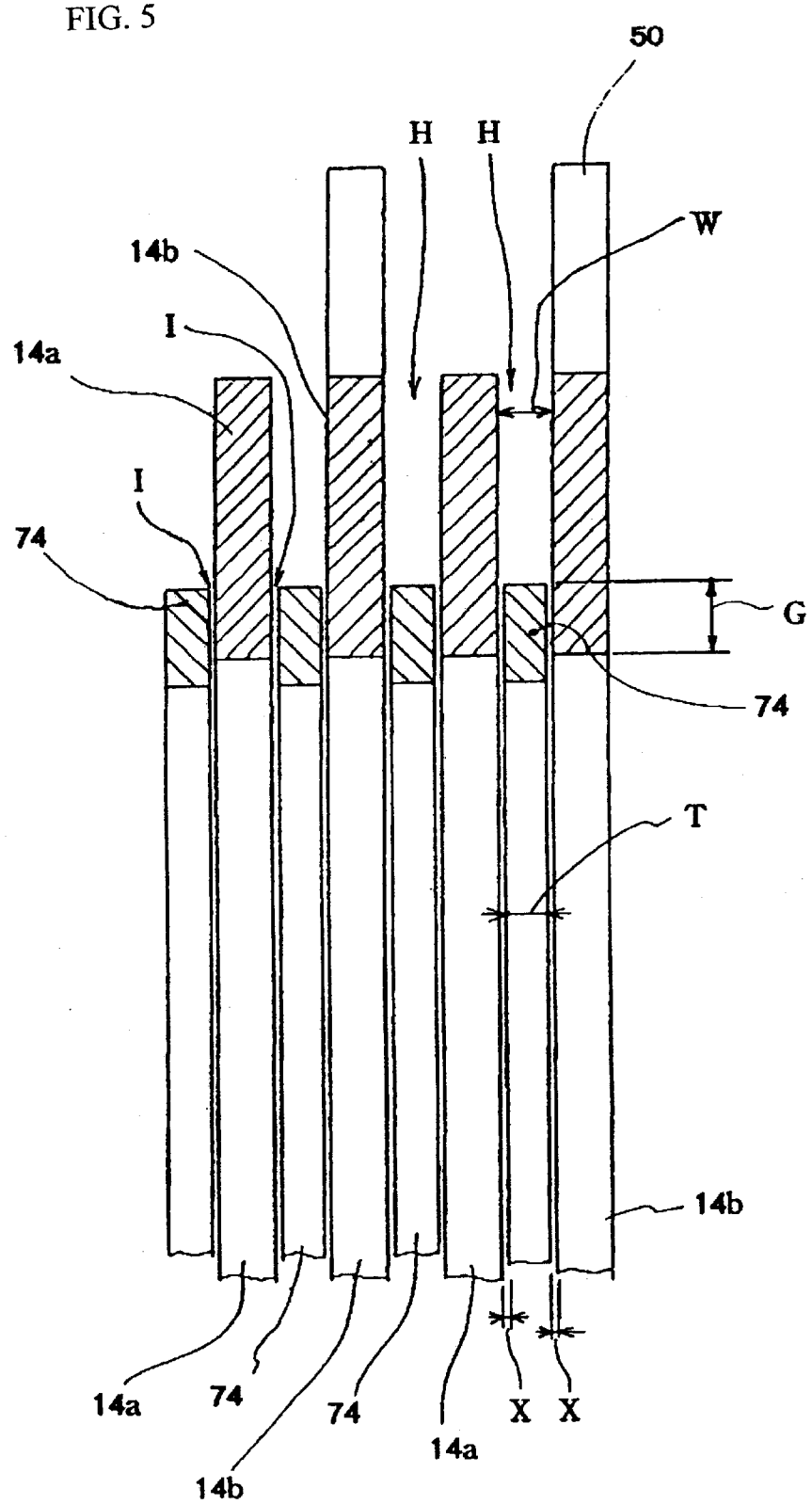
FIG. 5 is an enlarged sectional view of the essential portion of the strainer taken along the axis line thereof, illustrating the positional relationship between the circular ring members that form the strainer and the auxiliary circular ring members that form the scraper.

As a result of this arrangement, when the strainer 12 with the scraper components 76 assembled therein is viewed from one end, as seen from FIG. 1, some or all of the auxiliary circular ring members 74 of the scraper components 76 overlap in the entire inner circumferential area of the circular ring members 14 for an annular region that has a width G (see FIGS. 3 and 5).

Accordingly, when the liquid 18 passes from the external region C into the internal region B in the strainer 12, this liquid inevitably passes through the annular region that has the width G. Furthermore, in this annular region, the liquid 18 passes through the gaps that are formed between the end (flat) surfaces of the auxiliary circular ring members 74 and the end (flat) surfaces of the circular ring members 14 that face each other. In the present invention, these gaps can be freely set without taking the thickness of the scraper components 76 or the thickness of the auxiliary circular ring members 74 into consideration and can therefore naturally be set smaller than the thickness of the auxiliary circular ring members 74. The solid-liquid separating performance of the solid-liquid separating apparatus 70 of the present invention is thus significantly better than that of the prior art solid-liquid separating apparatus 10 in which the solid-liquid separating performance is limited by the thickness of the flat-plate-form protruding elements 22.

Furthermore, the flow path for the liquid 18 that contains solid matter 16 and has once entered the gaps between the circular ring members 14 is constricted by the auxiliary circular ring members 74 that are disposed on the inner circumferential side of the circular ring members 14; as a result, the force of the liquid is weakened. Accordingly, the liquid 18 resides in the gaps between the circular ring members 14 for a longer time, and the amount of solid matter 16 that adheres to the end (flat) surfaces of the circular ring members 14 increases. The solid-liquid separating performance is thus enhanced.

Figure 4:
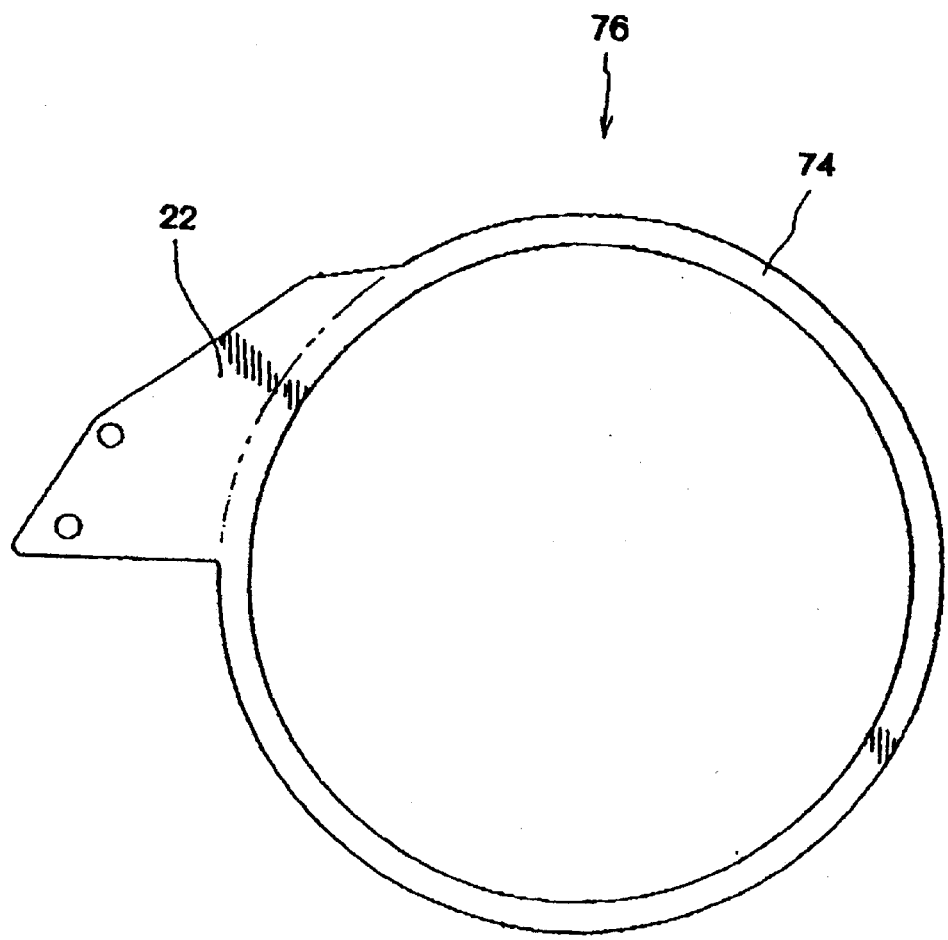
FIG. 4 is a front view of another scraper of the present invention comprising the auxiliary circular ring member and the flat plate-form protruding element.
Figure 8:
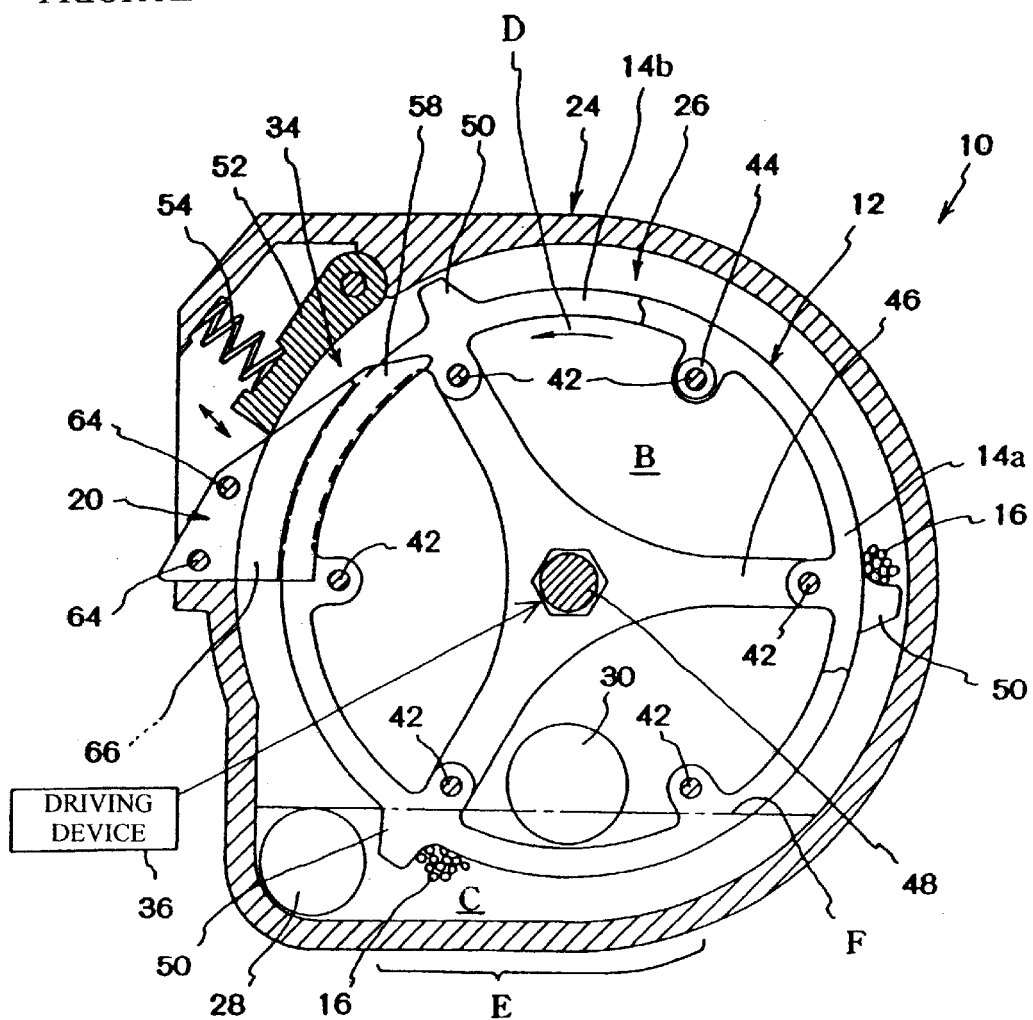
FIG. 8 is a sectional front view of the structure of the prior art solid-liquid separating apparatus.
Figure 9:
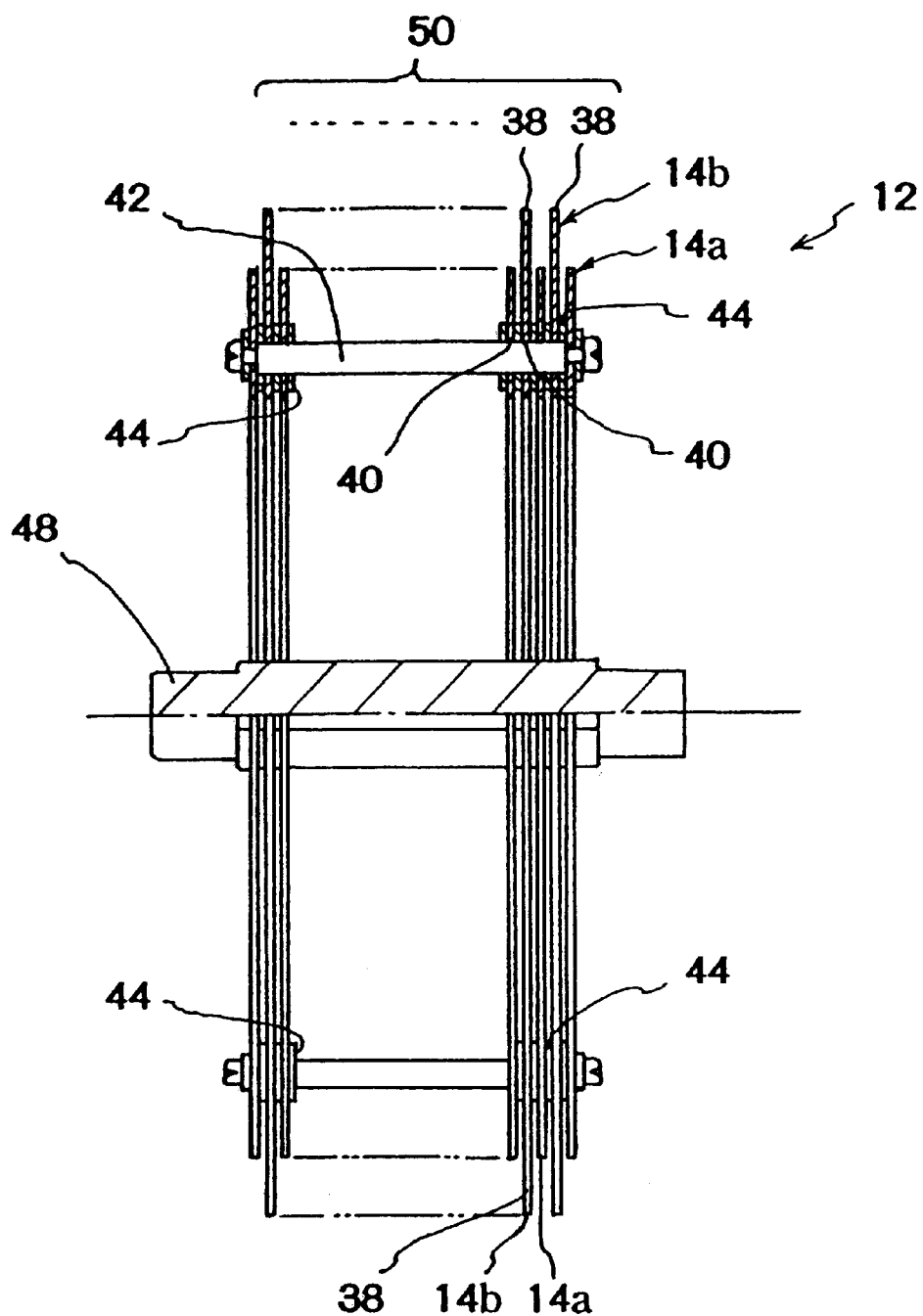
FIG. 9 is a side view of the strainer of the separating apparatus of FIG. 8.

Next, the structure of the solid-liquid separating apparatus 70 will be described in a more concrete fashion with reference to FIGS. 3 through 5. The basic structure is the same as that of the prior art solid-liquid separating apparatus 10 shown in FIGS. 8 through 10. Accordingly, the same constituting elements will be labeled with the same reference numerals, and a description of such elements will be omitted.

The characterizing features of the solid-liquid separating apparatus 70 of the present invention lie in the scraper 72 as described above. In the present invention, instead of the prior art second protruding elements 58 shown in FIG. 10, a scraper component 76 as shown in FIG. 4 is provided between the first and second circular ring members 14a and 14b so that the auxiliary circular ring member 74 is coaxial with the circular ring members 14a and 14b.

Figure 10:
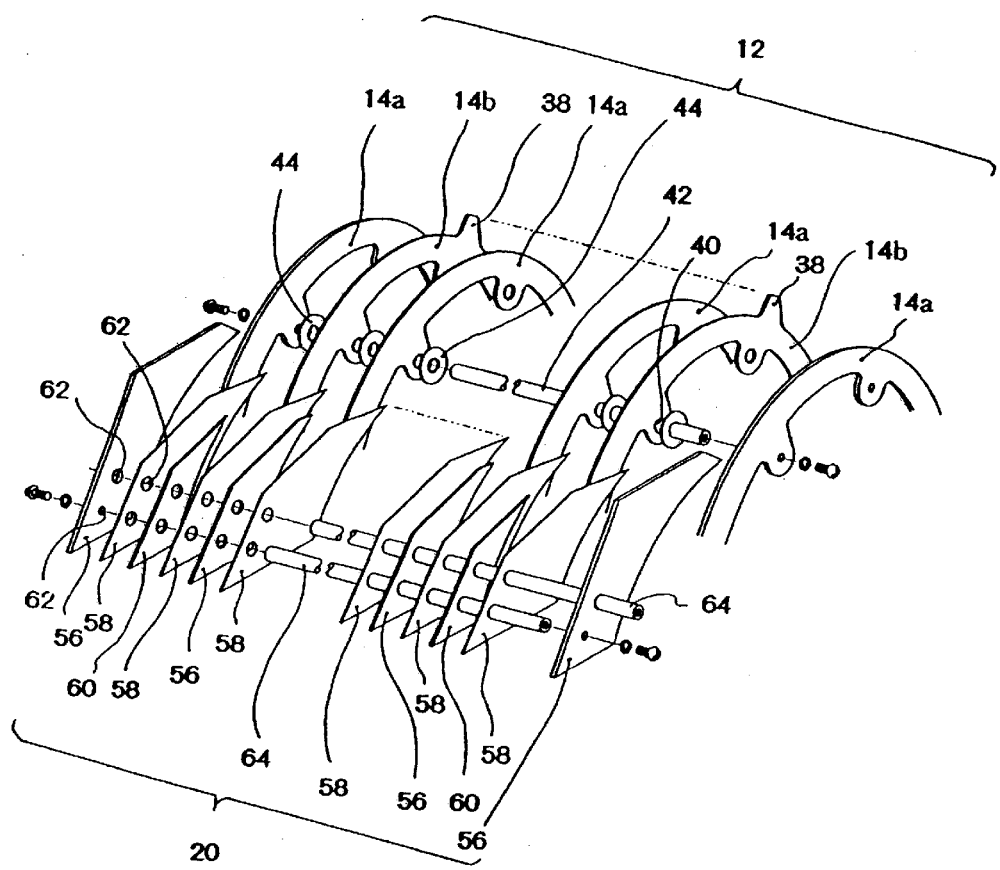
FIG. 10 is an exploded disassembled view of the strainer shown in FIG. 8.

More specifically, the flat-plate-form protruding element 22 of the scraper component 76 is substituted for the prior art second protruding element 58 and is disposed in a position of the second protruding element 58 shown in FIG. 10. The flat-plate-form protruding element 22 has the length so as to traverse the external region C of the casing 24; and as best seen the tip end of this flat-plate-form protruding element 22 is fixed to the casing 24. Second stays (that are referred to by the reference numeral 64 in FIG. 10) are passed through a plurality of protruding elements 22, so that the protruding elements 22 or the scraper components 76 are held and supported by the first protruding elements 56 and supporting elements 60.

The positional relationship between the first and second circular ring members 14a and 14b and the auxiliary circular ring members 74, which are integrally connected to the flat-plate-form protruding elements 22 that enter the gaps between the first and second circular ring members 14a and 14b, is substantially the same as that in the first embodiment. In other words, as seen from FIG. 5, the auxiliary circular ring members 74 are positioned on the inner circumferential side of the ring-form gaps formed between the first and second circular ring members 14a and 14b, and the area of mutual overlapping is defined as an annular region that has a width G.

Furthermore, the width W of the gaps H between the first circular ring members 14a and second circular ring members 14b (i.e., the width along the axial direction of the strainer 12 (right and left directions in FIG. 5)) is set so as to be greater than the thickness T of each of the scraper components 76; and the scraper components 76 are disposed in intermediate positions in the gaps H. As a result, gaps I are formed between the end (flat) surfaces of the auxiliary circular ring members 74 of the scraper components 76 and the end (flat) surfaces of the first and second circular ring members 14a and 14b that face the end surfaces of the auxiliary circular ring members 74; and such gaps I on both sides of each of the auxiliary circular ring member 74 have the same size of width X. Working precision or assembly precision would cause the auxiliary circular ring members 74 to shift positionally; and in such a situation, there may be some variation in the width X of the gaps I on both sides of each one of the scraper components 76.

When the liquid 18 that contains solid matter 16 flows into the internal region B of the strainer 12 from the external region C, this liquid 18 inevitably passes through the annular region that has the width G. Accordingly, the width X of the very narrow gaps I between the first and second circular ring members 14a and 14b determines the solid-liquid separating performance.

The width X of the gaps I can be independently set without being affected by the thickness T of the scraper components 76 (i.e., the thickness of the flat-plate-form protruding elements 22 and auxiliary circular ring members 74). Accordingly, unlike the prior art in which the width W of the gaps H between the first and second circular ring members 14a and 14b cannot be set smaller than the thickness of the flat-plate-form protruding elements 22, the solid-liquid separating performance (filtration performance) in the present invention is greatly improved while maintaining the thickness T of the scraper components 76 at a dimension that ensures the strength and durability.

The above embodiments are described with reference to a solid-liquid separating apparatus that is used in a raw contaminant dehydration treatment device and separates pulverized raw contaminants and water. It goes without saying that the present invention can be used for other than the separation of raw contaminants and water.

As seen from the above, in the solid-liquid separating apparatus of the present invention, gaps that determine the solid-liquid separating performance are obtained by the spaces between the auxiliary circular ring members of the scraper and the circular ring members of the strainer. Accordingly, unlike the prior art structure, the width of these gaps can be set smaller than the thickness of the scraper. In the prior art structure, however, the width of the gaps between the circular ring members of the strainer that determine the solid-liquid separating performance is affected by the thickness of the flat-plate-form protruding elements of the scraper and the width of such gaps cannot be set smaller than the thickness of the flat-plate-form protruding elements. Furthermore, in the present invention, the gaps that are present between the circular ring members and determine the solid-liquid separating performance can be set at the minimum without being affected by the thickness of the scraper. Accordingly, the present invention provides a greatly improved solid-liquid separating performance while the scraper has a thickness of sufficient strength and durability.

What is claimed is:

1. A solid-liquid separating apparatus comprising:
    a strainer that is a cylindrical body formed by a plurality of flat-plate-form circular ring members with gaps in between, said strainer being provided horizontally;
    a casing with an accommodating section for accommodating therein said strainer, said accommodating section being divided by said strainer into an internal region that is inside said strainer and an external region that is outside said strainer, an intake port that introduces a mixture of solid matter and liquid being formed in said external region, and an outlet port that discharges, to an outside of said casing, liquid that passes between said circular ring members and advances into said internal region being formed in said internal region, and
    a plurality of scrapers that are provided in said gaps between said circular ring members, said scrapers being moved in relative terms along outer circumferential surfaces of said circular ring members so as to scrape away solid matter adhering to said circular ring members,
    wherein each of said scrapers is comprised of:
        a flat-plate-form auxiliary circular ring member having an external diameter that is smaller than external diameter of said circular ring members and is larger than internal diameter of said circular ring members, and
        a flat-plate-form protruding element extending from an outer circumferential surface of said auxiliary circular ring member, said protruding element being in a same plane as said auxiliary circular ring member, and wherein
        said auxiliary circular ring member is disposed in coaxial with said circular ring members, and said flat-plate-form protruding element has a length that reaches said outer circumferential surfaces of said circular ring members.

2. The solid-liquid separating apparatus according to claim 1, wherein said flat-plate-form protruding element is disposed in plural numbers so as to be lined up in a single row.

3. A solid-liquid separating apparatus comprising:
    a strainer that is a cylindrical body formed by a plurality of flat-plate-form circular ring members with gaps in between, said strainer being provided horizontally;
    a casing with an accommodating section for accommodating therein said strainer so that said strainer is rotated, said accommodating section being divided by said strainer into an internal region that is inside said strainer and an atonal region that is outside said strainer, an intake port that introduces a mixture of solid matter and liquid being formed in said external region, and an outlet port that discharges, to an outside of said casing, liquid that passes between said circular ring members and advances into said internal region being formed in said internal region, and
    a plurality of scrapers provided in said gaps between said circular ring members that form said strainer, said scrapers coming into contact with solid matter adhering to said circular ring members when said strainer is rotated, thus scraping away said solid matter adhering to said circular ring members,
    wherein each of said scrapers is comprised of:
        a flat-plate-form auxiliary circular ring member having an external diameter that is smaller than external diameter of said circular ring members and is larger than internal diameter of said circular ring members, and
        a flat-plate-form protruding element extending from an outer circumferential surface of said auxiliary circular ring member, said protruding element being in a same plane as said auxiliary circular ring member, and wherein
        said auxiliary circular ring member is disposed in coaxial with said circular ring members, and said flat-plate-form protruding element traverses said external region of said casing with a tip end thereof fixed to said casing.

4. The solid-liquid separating device according to claim 1, further comprising axially extending ribs provided on an outer circumference of said circular ring members.

5. The solid-liquid separating device according to claim 3, further comprising axially extending ribs provided on an outer circumference of said circular ring members.

* * * * *